United States Patent
Mehta

(10) Patent No.: US 8,670,852 B2
(45) Date of Patent: Mar. 11, 2014

(54) AUDIO STREAMING SYSTEM AND METHOD FOR PERFORMING DISTRIBUTED AUDIO PROCESSING WITHIN THE SYSTEM

(75) Inventor: Dharmesh Mehta, Sunnyvale, CA (US)

(73) Assignee: NXP, B.V., Eindhoven (NL)

( * ) Notice: Subject to any disclaimer, the term of this patent is extended or adjusted under 35 U.S.C. 154(b) by 263 days.

(21) Appl. No.: 12/863,275

(22) PCT Filed: Jan. 24, 2009

(86) PCT No.: PCT/IB2009/050286
§ 371 (c)(1), (2), (4) Date: Jul. 16, 2010

(87) PCT Pub. No.: WO2009/093216
PCT Pub. Date: Jul. 30, 2009

(65) Prior Publication Data
US 2010/0292821 A1    Nov. 18, 2010

Related U.S. Application Data

(60) Provisional application No. 61/023,149, filed on Jan. 24, 2008.

(51) Int. Cl.
*G06F 17/00* (2006.01)

(52) U.S. Cl.
USPC ............................................................. 700/94

(58) Field of Classification Search
USPC .................. 700/94; 704/500–504; 369/1–12; 455/3.06
See application file for complete search history.

(56) References Cited

U.S. PATENT DOCUMENTS

2006/0030961 A1   2/2006   Lin
2007/0169115 A1*  7/2007   Ko et al. ........................ 717/174

FOREIGN PATENT DOCUMENTS

WO   2007/075376 A1   7/2007

OTHER PUBLICATIONS

International Search Report and Written Opinion for Int'l. Patent Appln. No. PCT/IB2009/050286 (Jan. 24, 2009).

* cited by examiner

*Primary Examiner* — Andrew C Flanders

(57) ABSTRACT

A system and method for performing distributed audio processing within the system uses streamed audio playing satellite units of the system to perform audio processing tasks, which are assigned to the appropriate streamed audio playing satellite units by an audio streaming base unit of the system.

20 Claims, 4 Drawing Sheets

AUDIO STREAMING SYSTEM AND METHOD FOR PERFORMING DISTRIBUTED AUDIO PROCESSING WITHIN THE SYSTEM

Audio streaming systems allow music and other audio data to be streamed to different remote locations. Thus, the audio data can be stored at a central location, which eliminates the need to transfer the audio data and/or devices with the audio data to the different locations. Depending on the audio streaming system, the audio data streamed to different remote locations can be the same audio data or different audio data.

Some audio streaming systems require the use of a personal computer (PC) as a base station to store and stream audio data to remote stations with speakers to play the streamed audio data. However, some audio streaming systems include a stand-alone base station that can store and stream audio data to remote stations without the use of a PC. In these PC-independent audio streaming systems, the base station may need to perform very time consuming audio processing tasks to provide features to enhance the experience of the users. These audio processing tasks may include performing complex mathematical analysis on one or more audio files and/or processing a large number of audio files. If the processor of the base station has a limited processing capability, then the base station may not be able to perform these computing tasks in a reasonable amount of time or may not be responsive to perform other operations, such as audio streaming-related operations.

The above concern may be addressed by using a high speed server processor in the base station. However, the use of a high speed server processor in the base station will increase the power usage and substantially increase the cost of the base station. An alternative solution is to add another processor to perform these special audio processing tasks. However, the use of another processor in the base station will increase the complexity and cost of the base station.

Thus, there is a need for a PC-independent audio streaming system that can perform time consuming audio processing tasks that provide enhanced features without the use of a high speed server processor or an additional processor in a base station of the system.

A system and method for performing distributed audio processing within the system uses streamed audio playing satellite units of the system to perform audio processing tasks, which are assigned to the appropriate streamed audio playing satellite units by an audio streaming base unit of the system. By using the processing capability of the streamed audio playing satellite units, the audio streaming base unit is available to perform other operations and be more responsive to user inputs.

A method for performing distributed audio processing over an audio streaming system in accordance with an embodiment of the invention comprises identifying an audio processing task to be performed on at least one audio file stored at an audio streaming base unit of the audio streaming system, selecting a streamed audio playing satellite unit of the audio streaming system to perform the audio processing task, the streamed audio playing satellite unit being configured to play audio files streamed from the audio streaming base unit, issuing the audio processing task to the streamed audio playing satellite unit, performing the audio processing task at the streamed audio playing satellite unit, and transmitting a result of the audio processing task from the streamed audio playing satellite unit to the audio streaming base unit.

An audio streaming system in accordance with an embodiment of the invention comprises at least one streamed audio playing satellite unit and an audio streaming base unit. The at least one streamed audio playing satellite unit is configured to play streamed audio files. The at least one streamed audio playing satellite unit comprises a processor to process the streamed audio files. The audio streaming base unit is connected to the at least one streamed audio playing satellite unit to communicate with the at least one audio streaming satellite. The audio streaming base unit includes a storage device to store a plurality of audio files. The audio streaming base unit is configured to stream the audio files to the audio streaming satellite. The audio streaming base unit further includes a task management module configured to identify an audio processing task to be performed on at least one of the audio files. The task management module is further configured to select a particular streamed audio playing satellite unit to perform the audio processing task. The task management module is further configured to issue the audio processing task to the particular streamed audio playing satellite unit. The particular streamed audio playing satellite unit is configured to perform the audio processing task in response to issuance of the audio processing task and to transmit a result of the audio processing task to the audio streaming base unit when the audio processing task is completed.

Other aspects and advantages of the present invention will become apparent from the following detailed description, taken in conjunction with the accompanying drawings, illustrated by way of example of the principles of the invention.

Figure 1:
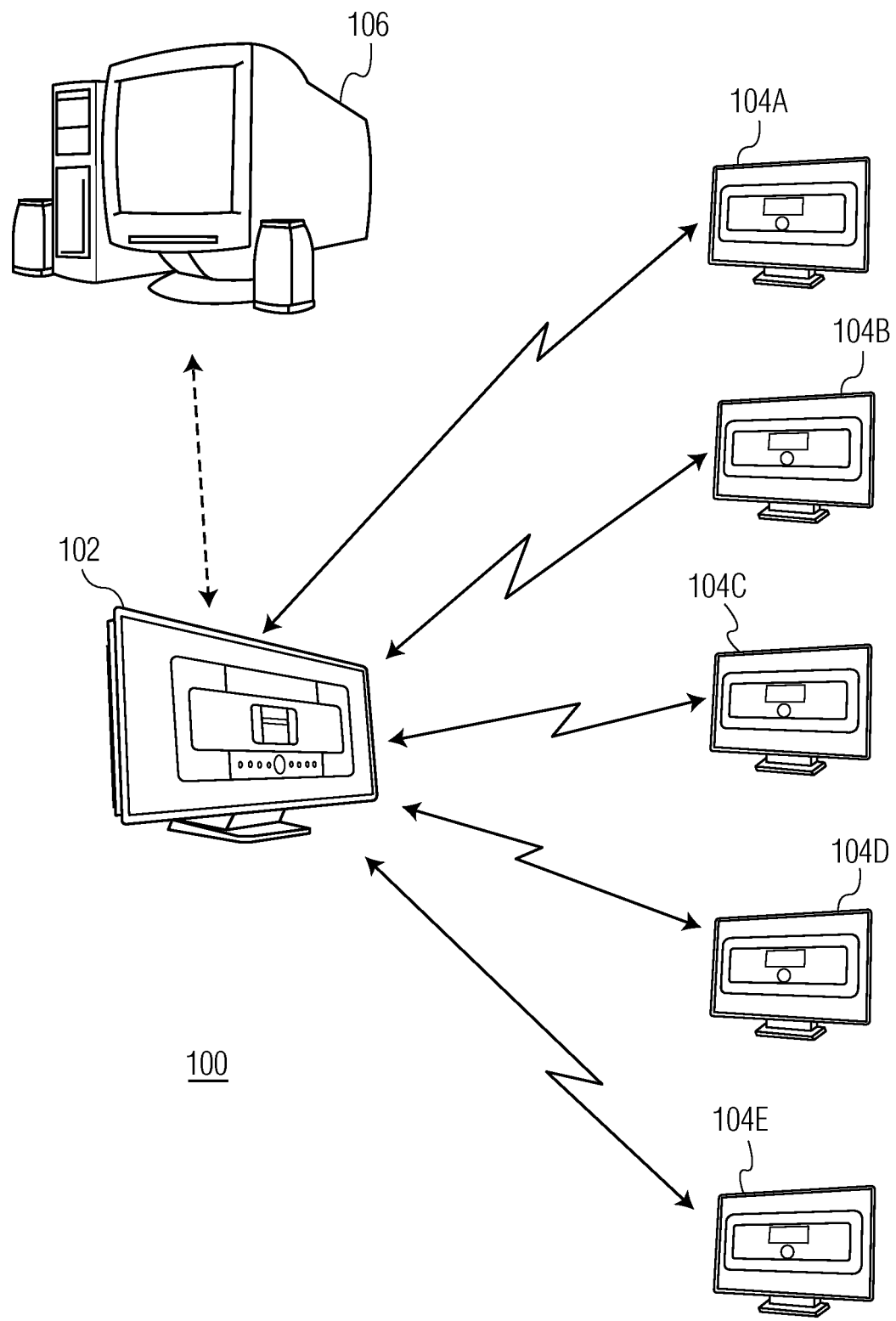
FIG. 1 shows an audio streaming system in accordance with an embodiment of the invention.

With reference to FIG. 1, an audio streaming system 100 in accordance with an embodiment of the invention is described. The audio streaming system 100 includes an audio streaming base unit 102 and a number of streamed audio playing satellite units 104A-104E, which are connected to the audio streaming base unit. In the illustrated embodiment, the connections between the audio streaming base unit 102 and the streamed audio playing satellite units 104A-104E are wireless connections, such as Wi-Fi connections. However, in other embodiments, the connections between the audio streaming base unit 102 and the streamed audio playing satellite units 104A-104E may be wired connections. Although only a single audio streaming base unit and five streamed audio playing satellite units are shown in FIG. 1, the audio streaming system 100 may include any number of audio streaming base units and audio streams satellite units. The audio streaming base unit 102 is configured to stream audio data or files, which are stored in the audio streaming base unit, to one or more of the streamed audio playing satellite units 104A-104E without the use of a personal computer (PC). Thus, the audio streaming system 100 is a PC-independent audio streaming system. However, in some embodiments, the audio streaming base unit 102 may be connected to a PC 106 to access the Internet through the PC or to access audio data stored in the PC. The audio streaming base unit 102 is further configured to communicate with the streamed audio playing satellite units 104A-104E by transmitting and receiving message signals. Consequently, the streamed audio playing satellite units 104A-104E are also configured to transmit and receive message signals to communicate with the audio streaming base unit 102. The streamed audio playing satellite units 104A-104E are also configured to receive and play the audio files streamed from the audio streaming base unit 102. As described in more detail below, the audio streaming base unit 102 is further configured to distribute time consuming audio processing tasks, which may be needed to enable enhanced features of the audio streaming system 100, to at least some of the audio streaming satellites units 104A-104E so that the audio streaming base unit is available to perform other operations and/or be more responsive to user commands entered into the audio streaming system.

Figure 2:
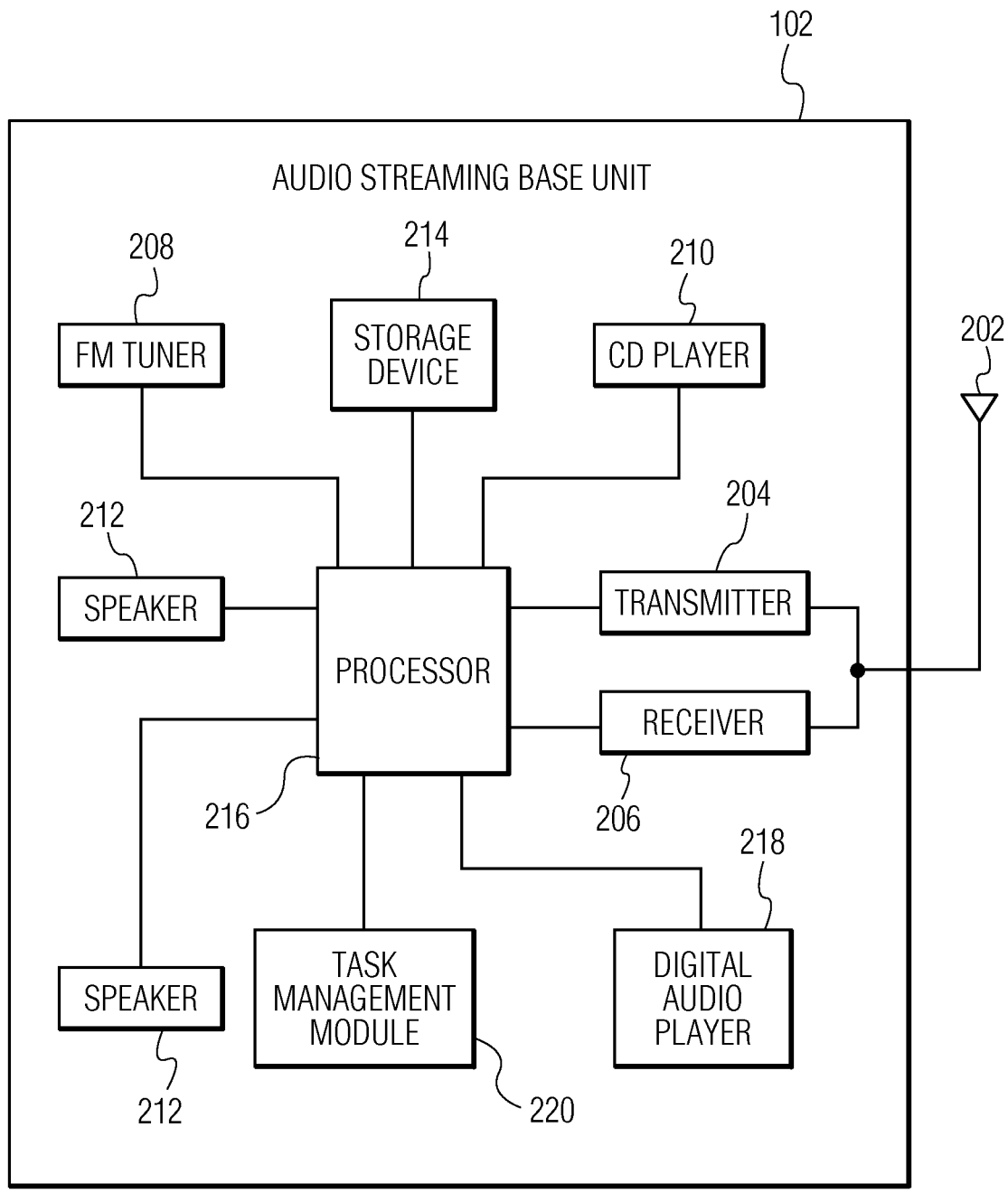
FIG. 2 is a block diagram of an audio streaming base unit of the audio streaming system of FIG. 1 in accordance with an embodiment of the invention.

FIG. 2 shows some of the components of the audio streaming base unit 102. As shown in FIG. 2, the audio streaming base unit 102 includes an antenna 202, a transmitter 204 and a receiver 206. The transmitter 204 and the receiver 206 are connected to the antenna 202. The transmitter 204 is configured to transmit outgoing signals to the streamed audio playing satellite units 104A-104E using the antenna 202. The receiver 206 is configured to receive incoming signals from the streamed audio playing satellite units 104A-104E using the antenna 202. In an embodiment, the transmitter 204 and the receiver 206 are configured to transmit and receive signals using Wi-Fi technology. However, in other embodiments, the transmitter 204 and the receiver 206 may be configured transmit and receive signals using other known technology.

The audio streaming base unit 102 also includes an FM tuner 208, a CD player 210, speakers 212, a storage device 214 and a processor 216. The FM tuner 208 and CD player 210 are well known components that are commonly found in consumer audio products. Thus, these components are not described here in detail. The FM tuner 208 allows the audio streaming base unit 102 to receive and play radio signals on the speakers 212. The received radio signals may also be recorded in the storage device 214, which can be any type of a storage device, such as a computer hard drive. The CD player 210 allows the audio streaming base unit 102 to play audio data from CDs (e.g., audio CDs, CD-Rs, CD-RWs and MP3WMA-CDs) on the speakers 212 or to save the audio data from the CDs in the storage device 214.

The processor 216 is connected to various components of the audio streaming base unit 102 to control those components. The processor 216 is connected to the transmitter 204 and the receiver 206 to control the transmission and reception of signals. The processor 216 is also connected to the FM tuner 208 and the CD player 210 to control these components. The processor 216 is also connected to the storage device 214 to access the data, including audio files, stored in the storage device. The processor 216 may be a general-purpose digital processor such as a microprocessor or microcontroller. In other embodiments, the processor 216 may be a special-purpose processor such as a digital signal processor. In other embodiments, the processor 216 may be another type of controller or a field programmable gate array (FPGA). Although the audio streaming base unit 102 is shown and described as having a single processor, the audio streaming base unit may include multiple processors in some embodiments. As shown in FIG. 2, the audio streaming base unit 102 further includes a digital audio player 218 and a task management module 220. The digital audio player 218 is configured to play audio files from the storage device 214 on the speakers 212. The digital audio player 218 may be configured to play different types of audio files, such as Windows Media Audio (WMA) files, MPEG Layer-3 (MP3) files and Pulse Code Modulation (PCM) files.

The task management module 220 is configured to perform operations to distribute audio processing tasks to the streamed audio playing satellite units 104A-104E. The task management module 220 is configured to identify audio processing tasks, which can be passed on to one or more of the streamed audio playing satellite units 104A-104E. These audio processing tasks can be any computing tasks performed on audio data. In some embodiments, the audio processing tasks may be tasks that need to be performed on new audio files stored in the audio streaming base unit 102 for various reasons, such as providing enhanced features to improve managing and playing of the stored audio files. As an example, the audio processing tasks may be tasks related to a like-music feature, which allows musical files stored in the audio streaming base unit 102 to be grouped with respect to music type using like-music keys. A like-music key of a musical file is unique for that musical file and indicates the music type of the musical file. A like-music key is generated by processing the entire music content of a musical file using a complex and lengthy mathematical computation to determine the music type of the musical file. Thus, tasks involved in generating like-music keys are good candidates for tasks to be performed by one or more of the streamed audio playing satellite units 104A-104E. As another example, the audio processing tasks may be tasks related to an auto-volume level feature, which automatically sets the volume level for an audio file so that a user does not have to change the volume level for each audio file, such as a musical file. The auto-volume level is determined by processing the entire audio content of an audio file using another complex mathematical computation. Thus, tasks involved in determining the auto-volume levels are also good candidates for tasks to be performed by one or more of the streamed audio playing satellite units 104A-104E. In these examples, each audio processing task may be to process one audio file or a set of audio files to produce like-music keys or to determine auto-volume levels.

The task management module 220 is also configured to determine which streamed audio playing satellite units from the streamed audio playing satellite units 104A-104E are capable of performing particular audio processing tasks to be distributed. Since the streamed audio playing satellite units 104A-104E are associated with the audio streaming base unit 102, the audio streaming base unit has knowledge regarding the associated streamed audio playing satellite units, including the processing capabilities of these units. The audio streaming base unit 102 uses this knowledge to make the determination regarding which streamed audio playing satellite units are capable of performing the audio processing tasks.

The task management module 220 is also configured to select one or more of the streamed audio playing satellite units 104A-104E that are capable of performing the audio processing tasks to perform those tasks. In an embodiment, this process involves receiving a request message from one of the streamed audio playing satellite units 104A-104E that indicates that the requesting streamed audio playing satellite unit is available or free to perform an appropriate processing task and, in response to the request message, checking to determine if there is a pending task that can be performed by the requesting streamed audio playing satellite unit. If there is a pending audio processing task that can be performed by the requesting streamed audio playing satellite unit, the task management module 220 is configured to issue that audio processing task to the requesting streamed audio playing satellite unit. In some embodiments, the audio processing task is issued along with a task identification (task-id) to keep track of which tasks are assigned and to which streamed audio playing satellite units. In some embodiments, the issued audio processing task also includes the tag of the audio file to be processed or a copy of the actual audio file, and the type of process to be performed on the file.

In other embodiments, the process of selecting one or more of the streamed audio playing satellite units 104A-104E involves transmitting a task inquiry message to one of the streamed audio playing satellite units to check if that streamed audio playing satellite unit is available to perform an appropriate processing task and receiving a confirmation message from the streamed audio playing satellite unit in response to the task inquiry message. The task inquiry message may be transmitted after the task management module 220 has identified the appropriate processing task for a particular streamed audio playing satellite unit.

After the audio processing task is issued to a particular streamed audio playing satellite unit, the task management module 220 may periodically transmit a status inquiry message to the streamed audio playing satellite unit. In other embodiments, the streamed audio playing satellite unit may periodically transmit status messages to the task management module 220 to inform the task management module how much of the assigned task has been performed, e.g., in term of percentage, or inform the task management module that the reporting streamed audio playing satellite unit is still working on the assigned task. The task management module 220 may issue an abort message to a streamed audio playing satellite unit if a predefined amount of time has passed without completion of the assigned task or the assigned task is not progressing in a defined manner. When the results of a particular task are received from one of the streamed audio playing satellite units 104A-104E, the task management module 220 records that the particular task has been completed.

The digital audio player 218 and the task management module 220 may be implemented in the audio streaming base unit 102 as software, hardware and/or firmware. The audio streaming base unit 102 includes other conventional components, which are not described herein so as to not obscure the inventive features of the audio streaming base unit.

Figure 3:
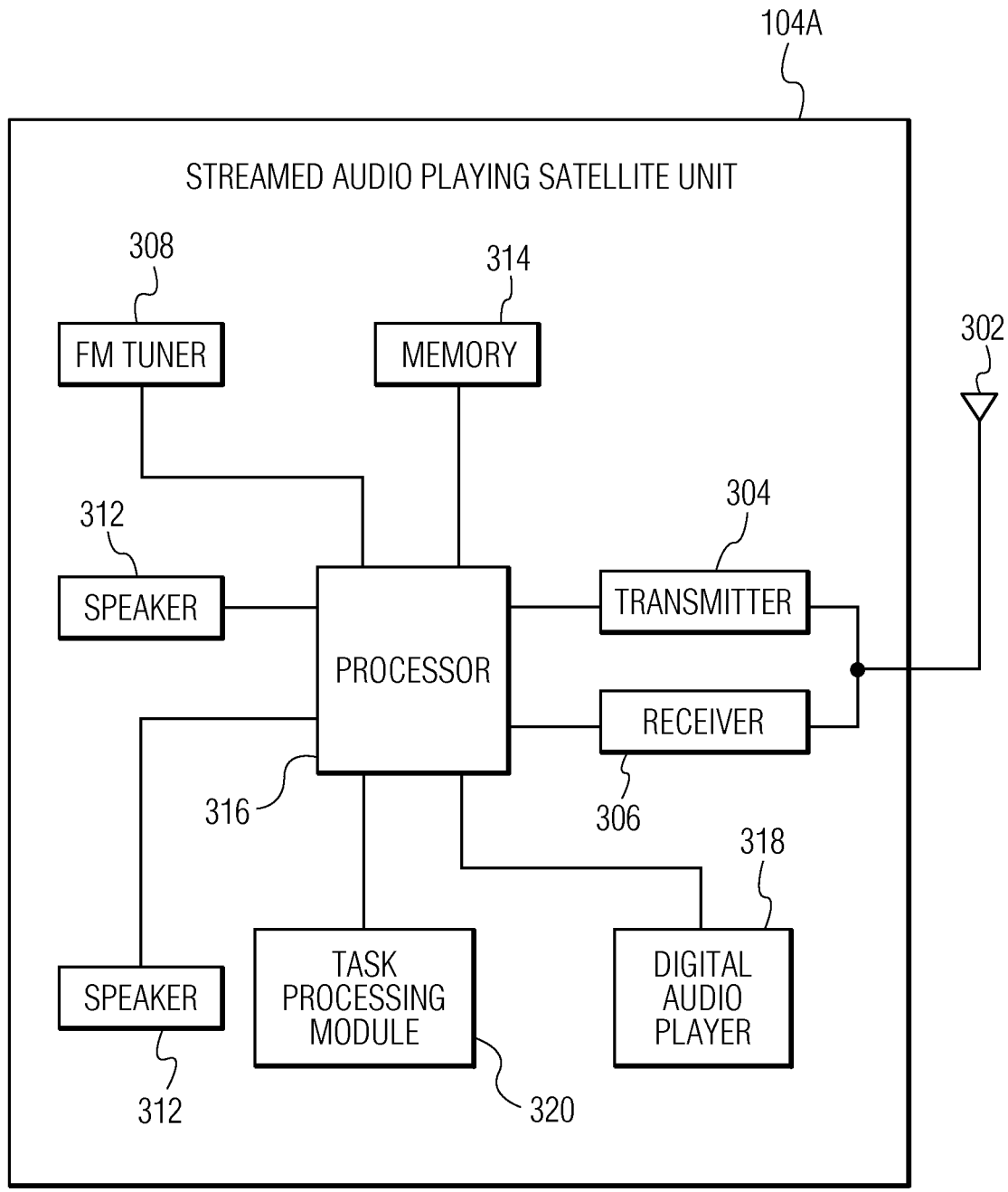
FIG. 3 is a block diagram of a streamed audio playing satellite unit of the audio streaming system of FIG. 1 in accordance with an embodiment of the invention.

FIG. 3 shows some of the components of the streamed audio playing satellite unit 104A, which is representative of the other streamed audio playing satellite units 104B-104E. As shown in FIG. 3, the streamed audio playing satellite unit 104A includes an antenna 302, a transmitter 304 and a receiver 306. The transmitter 304 and the receiver 306 are connected to the antenna 302. The transmitter 304 is configured to transmit outgoing signals to the audio streaming base unit 102 using the antenna 302. The receiver 306 is configured to receive incoming signals from the audio streaming base unit 102 using the antenna 302. In an embodiment, the transmitter 304 and the receiver 306 are configured to transmit and receive signals using Wi-Fi technology. However, in other embodiments, the transmitter 304 and the receiver 306 may be configured transmit and receive signals using other known technology.

The streamed audio playing satellite unit 104A also includes an FM tuner 308, speakers 312, a memory 314 and a processor 316. The FM tuner 308 allows the streamed audio playing satellite unit 104A to receive and play radio signals on the speakers 312. The processor 316 is connected to various components of the streamed audio playing satellite unit 104A to control those components. The processor 316 is connected to the transmitter 304 and the receiver 306 to control the transmission and reception of signals. The processor 316 is also connected to the FM tuner 308 to control the FM tuner. The processor 316 is also connected to the memory 314 to access the data stored in the memory. The processor 316 may be a general-purpose digital processor such as a microprocessor or microcontroller. In other embodiments, the processor 316 may be a special-purpose processor such as a digital signal processor. In other embodiments, the processor 316 may be another type of controller or a field programmable gate array (FPGA). Although the streamed audio playing satellite unit 104A is shown and described as having a single processor, the streamed audio playing satellite unit 104A may include multiple processors in some embodiments.

As shown in FIG. 3, the streamed audio playing satellite unit 104A further includes a digital audio player 318 and a task processing module 320. The digital audio player 318 is configured to play audio files streamed from the audio streaming base unit 102 on the speakers 312. The digital audio player 318 may be configured to play different types of audio files, such as WMM files, MP3 files and PCM files.

The task processing module 320 is configured to perform operations to execute audio processing tasks assigned to the streamed audio playing satellite unit 104A by the task management module 220 of the audio streaming base unit 102.

In an embodiment, the task processing module 320 is configured to transmit a request message to the task management module 220 of the audio streaming base unit 102 to inform the task management module that the streamed audio playing satellite unit 104A is available for performing tasks. When an audio processing task is issued to the streamed audio playing satellite unit 104A, the task processing module 320 instructs the processor 316 to process the task. In some embodiments, the task processing module 320 may periodically transmit a status message to the task management module 220 to inform the task management module how much of the assigned task has been performed, e.g., in term of percentage, or inform the task management module that the streamed audio playing satellite unit 104A is still working on the assigned task. If an abort message from the task management module 220 is received, the task processing module 320 will instruct the processor 316 to abort processing the task. After the assigned task is completed, the task processing module 320 transmits the results of the assigned task along with the task-id to the track management module 220 so that the task management module can note the completion of the assigned task by the streamed audio playing satellite unit 104A.

The digital audio player 318 and the task processing module 320 may be implemented in the streamed audio playing satellite unit 104A as software, hardware and/or firmware. The streamed audio playing satellite unit 104A includes other conventional components, which are not described herein so as to not obscure the inventive features of the streamed audio playing satellite unit 104A.

Figure 4:
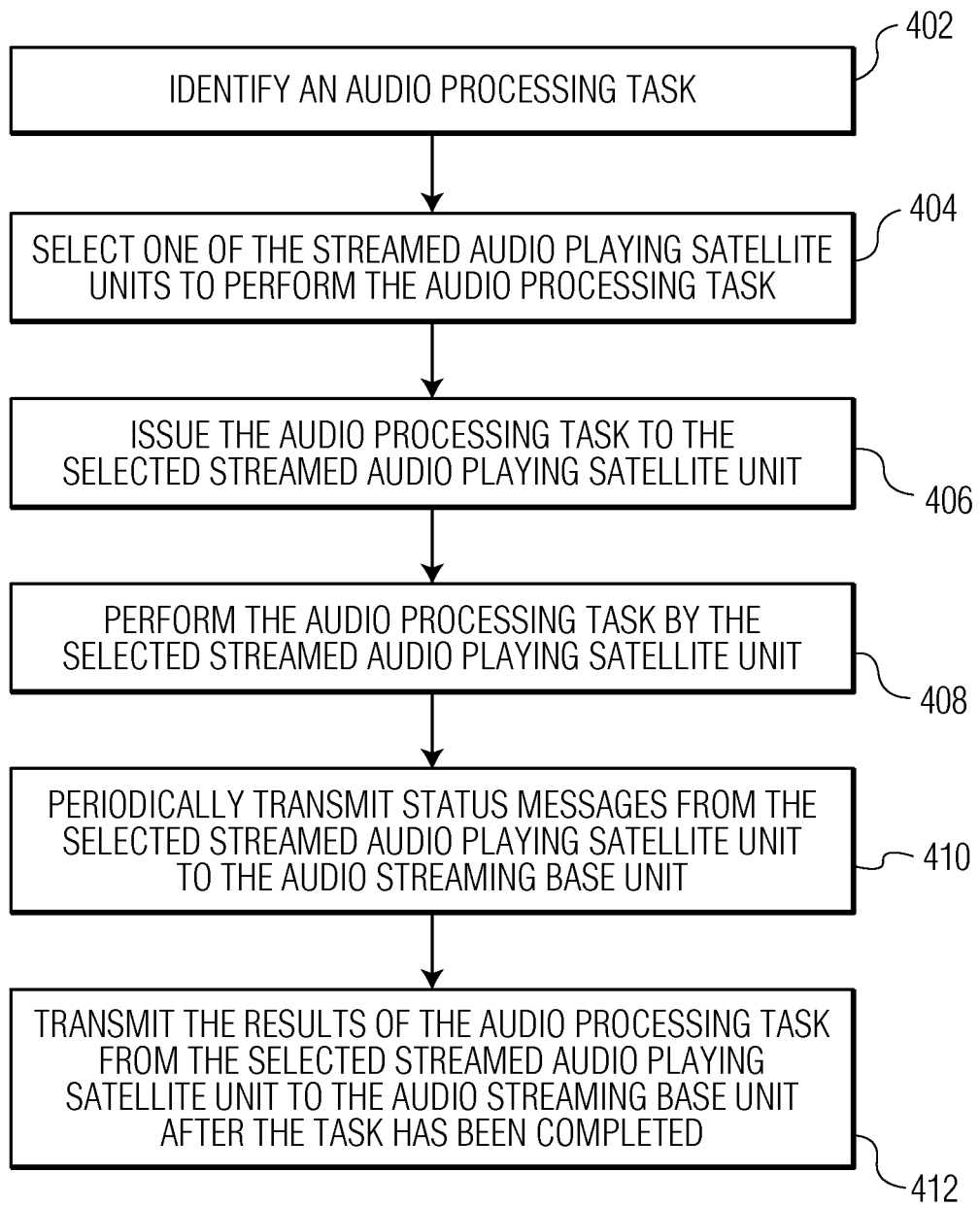
FIG. 4 is a process flow diagram of a distributed audio processing operation performed by the audio streaming system of FIG. 1 in accordance with an embodiment of the invention.

The distributed audio processing operation performed by the audio streaming system 100 in accordance with an embodiment of the invention is described with reference to a process flow diagram of FIG. 4. At block 402, an audio processing task is identified by the task management module 220 of the audio streaming base unit 102. In some embodiments, the audio processing task is identified when one or more new audio files are received and stored in the audio streaming base unit 102. As an example, the new audio files may need to be processed to produce a like-music key or to determine the auto-volume level for each of the audio files.

Next, at block 404, one of the streamed audio playing satellite units 104A-104E is selected by the task management module 220 to perform the audio processing task. In some embodiments, the task management module 220 selects one of the streamed audio playing satellite units 104A-104E when a request message from a particular streamed audio playing satellite unit is received and a check is made whether there is a task for the requesting streamed audio playing satellite unit to perform. In other embodiments, the task management module 220 selects one of the streamed audio playing satellite units 104A-104E for performing a task when a confirmation message from a particular streamed audio playing satellite unit is received in response to a task inquiry message to that streamed audio playing satellite unit.

Next, at block 406, the audio processing task is issued to the selected streamed audio playing satellite unit from the audio streaming base unit 102, which may involve transmitting a tag of an audio file to be processed or a copy of the audio file and the task-id.

Next, at block 408, the audio processing task is performed by the selected streamed audio playing satellite unit in response to the issuance of the task. Next, at block 410, status messages are periodically transmitted from the selected streamed audio playing satellite unit to the audio streaming base unit to inform the audio streaming base unit how much of the assigned task has been performed, e.g., in term of percentage, or inform the audio streaming base unit that the reporting streamed audio playing satellite unit is still working on the assigned task.

Next, at block 412, the results of the audio processing task are transmitted from the selected streamed audio playing satellite unit to the audio streaming base unit after the assigned task has been completed.

The transmission of messages and other signals related to distributed audio processing may be over the same channel on which audio files are streamed from the audio streaming base unit 102 to the streamed audio playing satellite units 104A-104E. Alternatively, a different communication channel between the audio streaming base unit 102 and the streamed audio playing satellite units 104A-104E may be used for the transmission of messages and other signals related to distributed audio processing.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing distributed audio processing within an audio streaming system for use with a plurality of streamed audio playing satellite units, the method comprising:
    identifying an audio processing task to be performed on at least one audio file stored at an audio streaming base unit of the audio streaming system in response to a communication between the audio streaming base unit and at least one of the plurality of streamed audio playing satellite units;
    in response to the communication, determining if the audio processing task to be performed is appropriate by comparing the audio processing task to be performed to an attribute of the streamed audio playing satellite unit;
    in response to the comparing, selecting a streamed audio playing satellite unit of the audio streaming system to perform the audio processing task, the streamed audio playing satellite unit being configured to play audio files streamed from the audio streaming base unit;
    issuing the audio processing task to the streamed audio playing satellite unit;
    performing the audio processing task on at least one of the audio files streamed from the audio streaming base unit at the streamed audio playing satellite unit to determine musical or audio characteristics unique to the audio file; and
    transmitting a result of the audio processing task from the streamed audio playing satellite unit to the audio streaming base unit.

2. The method of claim 1 wherein the issuing the audio processing task includes transmitting a task identification and a tag of an audio file, including a type of the audio processing task to be performed on the audio file, to be processed or a copy of the audio file, and the attribute of the streamed audio playing satellite unit is an availability of the streamed audio playing satellite unit the audio processing task.

3. The method of claim 1 wherein the identifying the audio processing task is performed after one or more new audio files are received at the audio streaming base unit, and the attribute of the streamed audio playing satellite unit is a capability of the streamed audio playing satellite unit to perform the audio processing task.

4. The method of claim 1 wherein the selecting the streamed audio playing satellite unit includes receiving a request message from the streamed audio playing satellite unit at the audio streaming base unit that indicates that the streamed audio playing satellite unit is available to perform an appropriate processing task.

5. The method of claim 1 wherein the selecting the streamed audio playing satellite unit includes transmitting a task inquiry message from the audio streaming base unit to the streamed audio playing satellite unit to determine if the streamed audio playing satellite unit is available to perform the audio processing task.

6. The method of claim 1 further comprising periodically transmitting a status message from the streamed audio playing satellite unit to the audio streaming base unit to inform the audio streaming base unit of the current status of the audio processing task being performed at the streamed audio playing satellite unit.

7. The method of claim 1 further comprising transmitting an abort message from the audio streaming base unit to the streamed audio playing satellite unit if a predefined amount of time has passed without completion of the audio processing task or the audio processing task is not progressing in a defined manner.

8. The method of claim 1 wherein the audio processing task includes performing complex mathematical computation on an audio file to determine the type of music of the audio file.

9. The method of claim 1 wherein the audio processing task includes performing complex mathematical computation on an audio file to determine an auto-volume level for the audio file.

10. The method of claim 1 wherein the selecting the streamed audio playing satellite unit includes selecting the streamed audio playing satellite unit from a plurality of streamed audio playing satellite units that are connected to the audio streaming base unit.

11. An audio streaming system comprising:
    at least one streamed audio playing satellite unit configured to play streamed audio files, each of the at least one streamed audio playing satellite unit comprising a processor to process the streamed audio files; and
    an audio streaming base unit connected to the at least one streamed audio playing satellite unit to communicate with the at least one audio streaming satellite, the audio streaming base unit including a storage device to store a plurality of audio files, the audio streaming base unit being configured to stream the audio files to the at least one audio streaming satellite, the audio streaming base unit further including a task management module configured to identify an audio processing task to be performed on at least one of the audio files in response to a communication between the audio streaming base unit and at least one of a plurality of streamed audio playing satellite units and determine if the audio processing task to be performed is appropriate by comparing the audio processing task to be performed to an attribute of at least one of the streamed audio playing satellite units, the task management module being further configured to select a particular streamed audio playing satellite unit, in response to the comparison, to perform the audio processing task, the task management module being further configured to issue the audio processing task to the particular streamed audio playing satellite unit, wherein the particular streamed audio playing satellite unit is configured to perform the audio processing on at least one of the audio files streamed from the audio streaming base unit to determine musical or audio characteristics unique to the audio file in response to issuance of the audio processing task and to transmit a result of the audio processing task to the audio streaming base unit when the audio processing task is completed.

12. The audio streaming system of claim 11 wherein the task management module of the audio streaming base wilt is configured to transmit a task identification and a tag of an audio file, including a type of the audio processing task to be performed on the audio file, to be processed or a copy of the audio file to the particular streamed audio playing satellite unit when the audio processing task is issued, and the attribute of the streamed audio playing satellite unit is an availability of the streamed audio playing satellite unit to perform the audio processing task.

13. The audio streaming system of claim 11 wherein the task management module of the audio streaming base unit is configured to identify the audio processing task after one or more new audio files are received at the audio streaming base unit, and the attribute of the streamed audio playing satellite unit is a capability of the streamed audio playing satellite unit to perform the audio processing task.

14. The audio streaming system of claim 11 wherein the task management module of the audio streaming base unit is configured to select the particular streamed audio playing satellite unit in response to the communication from the particular streamed audio playing satellite unit that indicates that the particular streamed audio playing satellite unit is available to perform the appropriate processing task.

15. The audio streaming system of claim 11 wherein the task management module of the audio streaming base unit is configured to transmit a task inquiry message to the particular streamed audio playing satellite unit to determine if the particular streamed audio playing satellite unit is available to perform the audio processing task in order to select the particular streamed audio playing satellite unit.

16. The audio streaming system of claim 11 wherein the particular streamed audio playing satellite unit is configured to periodically transmit a status message to the audio streaming base unit to inform the audio streaming base unit the current status of the audio processing task being performed at the particular streamed audio playing satellite unit.

17. The audio streaming system of claim 11 wherein the task management module of the audio streaming base unit is configured to transmit an abort message to the particular streamed audio playing satellite unit if a predefined amount of time has passed without completion of the audio processing task or the audio processing task is not progressing in a defined manner.

18. The audio streaming system of claim 11 wherein the audio processing task includes performing complex mathematical computation on an audio file to determine the type of music of the audio file.

19. The audio streaming system of claim 11 wherein the audio processing task includes performing complex mathematical computation on an audio file to determine an auto-volume level for the audio file.

20. The audio streaming system of claim 11 wherein the task management module of the audio streaming base unit is configured to select the particular streamed audio playing satellite unit from a plurality of streamed audio playing satellite units that are connected to the audio streaming base unit.

* * * * *